US008630059B1

(12) United States Patent
Chen et al.

(10) Patent No.: US 8,630,059 B1
(45) Date of Patent: Jan. 14, 2014

(54) METHODS FOR CLOSED-LOOP COMPENSATION OF ULTRA-HIGH FREQUENCY DISTURBANCES IN HARD DISK DRIVES AND HARD DISK DRIVES UTILIZING SAME

(75) Inventors: Xu Chen, Albany, CA (US); Wei Xi, Mission Viejo, CA (US); Young-Hoon Kim, Cupertino, CA (US); Kuang-Yang Tu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 142 days.

(21) Appl. No.: 13/408,974

(22) Filed: Feb. 29, 2012

(51) Int. Cl.
*G11B 5/596* (2006.01)
(52) U.S. Cl.
USPC ............................................. 360/78.14
(58) Field of Classification Search
USPC ............. 360/78.14, 78.09, 78.06, 244, 77.02, 360/77.04; 369/30.16, 44.27, 44.28, 44.29
See application file for complete search history.

(56) References Cited

U.S. PATENT DOCUMENTS

| 7,158,334 | B2 | 1/2007 | Iwashiro |
| 7,319,570 | B2 | 1/2008 | Jia et al. |
| 7,609,474 | B2 * | 10/2009 | Takaishi ............ 360/78.09 |
| 2004/0213100 | A1 | 10/2004 | Iwashiro |
| 2005/0096793 | A1 | 5/2005 | Takeuchi |
| 2007/0064334 | A1 | 3/2007 | Jia et al. |

* cited by examiner

*Primary Examiner* — Nabil Z Hindi (57) ABSTRACT

A disk drive comprises a disk, an actuator arm and a servo controller using a position error signal to generate a controller output signal to control the actuator arm. A plant mechanically models at least a portion of the disk drive, receives a control command to which an unknown disturbance is added and generates a plant output. A disturbance observer (DOB) uses the control command and the plant output to generate a delayed and estimated version of the disturbance. The DOB comprises a Q filter having a selected center frequency. A perfect phase cancellation filter (PPCF) is configured to receive the delayed and estimated version of the disturbance, to reject selected disturbances and to align the desired attenuation frequency with the selected center frequency. The output of the PPCF is subtracted from the controller output signal to generate the control command.

32 Claims, 6 Drawing Sheets

METHODS FOR CLOSED-LOOP COMPENSATION OF ULTRA-HIGH FREQUENCY DISTURBANCES IN HARD DISK DRIVES AND HARD DISK DRIVES UTILIZING SAME

BACKGROUND

The importance of safe and flexible disturbance rejection at high frequencies has been ever increasing in modern control systems. For example, the deployment of hard disk drives (HDD) in all-in-one desktop/laptop computers and in intelligent TVs requires that the HDD control system be robust to (e.g., have the ability to reject, attenuate) vibration disturbances that can occur at, for example, 5000 Hz and 6000 Hz, which capability has, thus far, been unattainable.

The disturbance observer (DOB) is a widely known feedback control technique. The basic operation of a DOB is based upon the known proposition that, for the servo control system, if the control command, the system output, and the is plant are known, then the disturbance in the system can be estimated. Because an inverse model of a conventional dynamic system is in general a non-causal system, delay terms are added in digital disturbance observers to make the inverse realizable. Because the inverse transfer function amplifies measurement noise, a low-pass or band-pass Q filter is used to improve the signal to noise ratio (SNR). The low-pass Q-filter approach intrinsically cannot help reject high-frequency disturbances since it is unable to estimate the high-frequency disturbances. Additionally, the DOB works to reject a disturbance d(k) by performing the operation d(k)–$d_{est}$(k–m), where the subscript est denotes estimation and m represents the delay of the plant (in this case, a mechanical model of at least a portion of a hard disk drive, such as a model of an actuator arm actuated by a VCM). However, such solutions cannot meet the requirements in ultra-high frequency disturbance rejection (such as rejection of disturbances at 5000 and 6000 Hz, for example), since the m-step delay causes mismatched signal cancellation and even system instability at such high frequencies. Moreover, in DOBs equipped with band-pass Q filters, the designed center frequency of the Q filter does not align with that of the final error rejection curve (ERC), resulting in greatly increased tuning time and consequently increased product cost.

Figure 1:
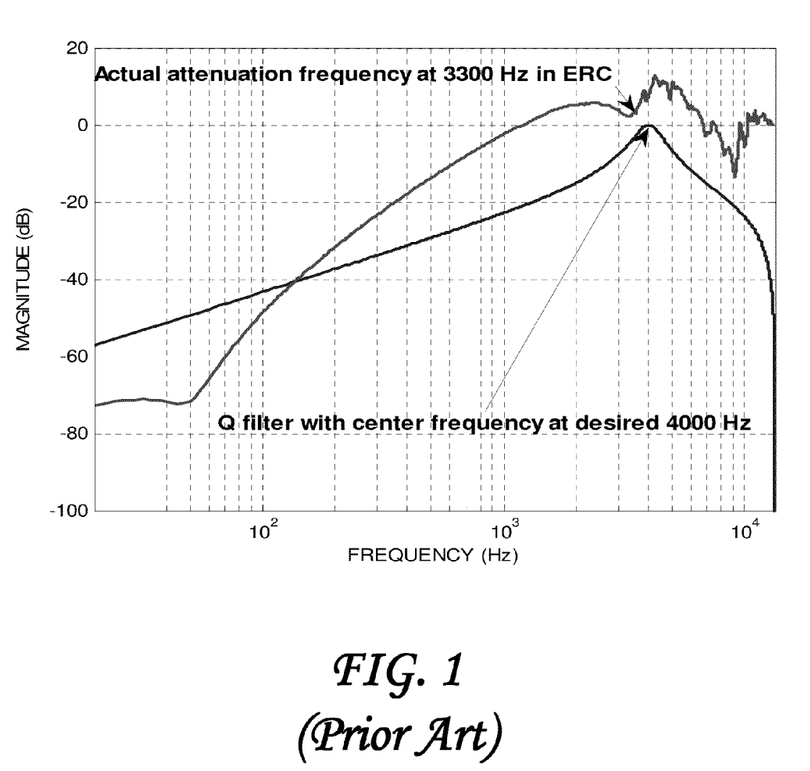
FIG. 1 shows a graph of the desired versus the actual attenuation performance of a conventional closed-loop control system comprising a DOB.

In FIG. 1, the delay factor m (computed from the identified model of the plant) is equal to 2, the sampling time in the control system $T_s=3.75\times10^{-5}$ sec, and the center frequency $\omega_0$ of the Q filter is 4000 Hz. It is observed that in the actual closed-loop ERC, disturbances at 4000 Hz are not attenuated but are, in fact, undesirably amplified due to this problematic frequency mismatch. In this example, it can be computed that the m=2 steps of delays translate to m×360×4000×$T_s$=108.108 degrees of phase lag during the disturbance cancellation d(k)–$d_{est}$(k–m).

When hard disk drives are incorporated into consumer devices such as, for example, televisions, the tone noise from the TV's speakers or the entertainment system typically varies from about 20 Hz to about 16000 Hz (i.e., generally within the range of human hearing). However, when the tone noise sweeps above 3000 Hz, conventional DOB disturbance estimation and cancellation schemes do not have the capability to attenuate the resulting disturbance. Indeed, theoretical limitations prevent the conventional DOB scheme from being applied to environments is susceptible to ultra-high (e.g., 4000 Hz and above) frequency disturbance environments.

What are needed, therefore, are methods for accurately controlling hard disk drives that do not suffer from the aforementioned disadvantages and that are configured to function in the presence of ultra-high frequency disturbances.

DETAILED DESCRIPTION

Figure 2A:
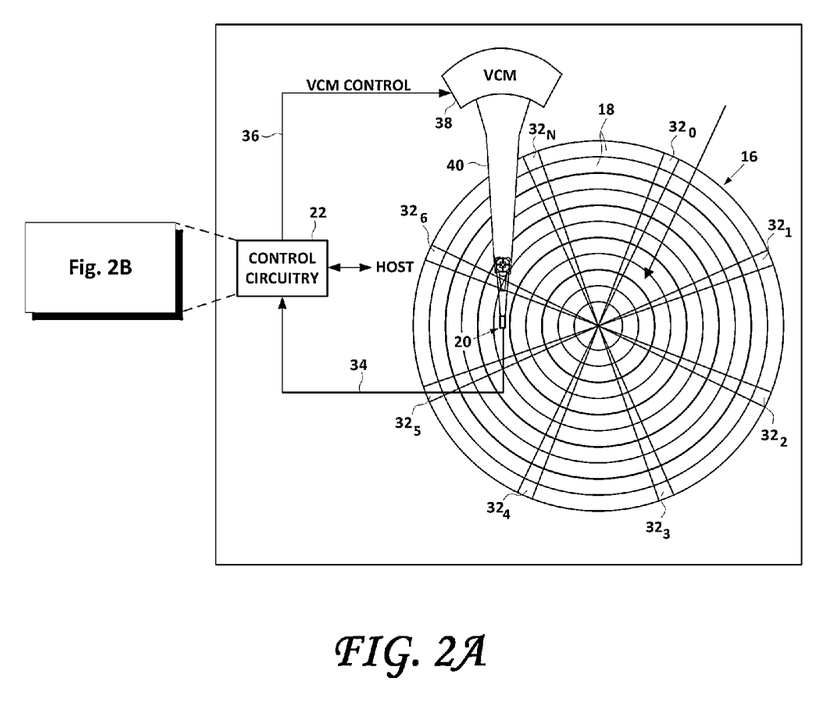
FIG. 2A shows a simplified diagram of a hard disk drive according to one embodiment.
Figure 2B:
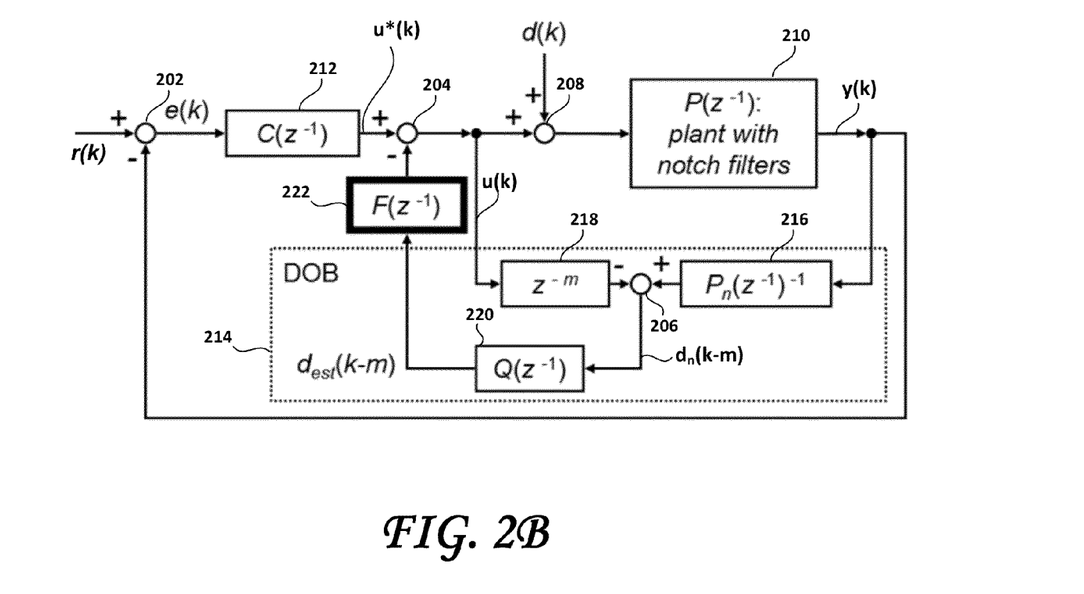
FIG. 2B is a diagram of a closed-loop servo control system according to one embodiment.

FIG. 2A shows a disk drive according to one embodiment. The disk drive comprises a disk 16 having a plurality of tracks 18, and a head 20 actuated over the disk 16. The disk drive further comprises control circuitry 22 that is operable to execute, among other structure and functionality, the closed-loop servo control system according to one embodiment, as shown in FIG. 2B. In the embodiment of FIG. 2A, the is disk 16 comprises a plurality of embedded servo sectors $32_0$-$32_N$. Each servo sector $32_0$-$32_N$ may comprise head positioning information such as a track address for coarse positioning during seeks, and servo bursts for fine positioning while tracking the centerline of a target track during write/read operations. The control circuitry 22 processes a read signal 34 emanating from the head 20 to demodulate the servo sectors into a position error signal (PES). The PES is filtered with a suitable compensation filter to generate a control signal 36 that is applied to a Voice Coil Motor (VCM) 38 that pivots the actuator arm 40 about a pivot in a direction that reduces the PES. In one embodiment, the control circuitry comprises a closed-loop servo control system, the details of which are further illustrated in FIG. 2B.

FIG. 2B is a diagram of a closed-loop servo control system according to one embodiment. As shown therein, the disturbance cancelation device and functionality shown therein comprises subtractors 202, 204 and 206 and an adder 208. A reference signal r(k) is the input to the subtractor 202, from which the fed-back output y(k) of the Plant 210 $P(z^{-1})$ is subtracted. That is, the resulting error signal (Position Error Signal or PES) e(k) output from the subtractor 202 is obtained from the difference of the reference signal r(k) and the output signal y(k), which is the output of the Plant 210 $P(z^{-1})$. The PES signal e(k) is input into the servo controller $C(z^{-1})$, referenced at numeral 212 in FIG. 2B. The servo controller 212 receives the input error signal e(k) and calculates a controller output signal u*(k).

In one embodiment, a Disturbance Observer or DOB comprises some or all of the elements enclosed by the dashed box 214 in FIG. 2B. There are two inputs to the DOB 214 in FIG. 2B. The first input to the DOB 214 is the plant output y(k) (the output of the Plant 210 $P(z^{-1})$). The output y(k) of the Plant 210 $P(z^{-1})$ is fed to the inverse plant model $P_n(z^{-1})^{-1}$, denoted by reference numeral 216. The other input to the DOB 214 in FIG. 2B is a control command u(k) (which corresponds to the current applied to the VCM and to the resultant torque applied thereby) that is the input to the Plant 210 $P(z^1)$ minus the disturbance d(k). The control command u(k) is delayed by m cycles (the delay m at delay module 218 is determined by the Plant 210 $P(z^1)$) and the delayed signal therefrom is fed to subtractor 206. The difference between the output of the delay module 218 and the output of the inverse plant model $P_n(z^-)^{-1}$ is a model of the delayed disturbance $d_n(k-m)$. As shown in FIG. 2B, in one embodiment, the model of the delayed disturbance $d_n(k-m)$ is input into a Q filter shown at $Q(z^{-1})$ and referenced at 220. The output of the Q filter $Q(z^{-1})$ 220 is $d_{est}(k-m)$, which is a delayed and estimated version of the disturbance d(k), which d(k) is added (at 208) to the control command from the subtracter 204 to form the input to the Plant 210 $P(z^{-1})$. As shown, the estimated and delayed disturbance $d_{est}(k-m)$ is the output of the DOB 214.

FIG. 2B illustrates one or more filter design and method embodiments that near-perfectly reject disturbances at ultra-high frequencies in a control system and that, in addition, perfectly align the desired and the actual attenuation frequencies in a disturbance observer. One embodiment provides, for example, hard disk drives with the capacity to rejecting vibrations at up to 6000 Hz, thus greatly enhancing the drive performance and extending the applications of hard disk drives to various heavy-vibration environments such as, for example, HDD-containing televisions, HDD-containing Digital Video players and laptops.

One embodiment achieves perfect or near perfect cancellation of disturbances at the desired frequencies. In addition, the mismatch (see FIG. 1) between the center frequency of the Q filter and the ERC can be perfectly or near-perfectly removed. To do so, one embodiment utilizes the output of the DOB 214 and feed that estimated and delayed disturbance $d_{est}(k-m)$ to a digital filter $F(z^{-1})$, referenced at 222. The digital filter 222 is designed to cancel the phase mismatch between the center frequency $\omega_0$ of the Q filter 220 and the attenuation of the final error rejection curves ERC. The filter $F(z^{-1})$ 222 is herein also called a Perfect Phase Cancellation Filter (PPCF), to perfectly (or near perfectly): (1), compensate for the Plant 210's m-step delay; (2), remove the frequency mismatch.

In FIG. 2B, Plant 210 $P(z^{-1})$ is a plant that is controlled with the resonance properly compensated by notch filters and $C(z^{-1})$ is the baseline feedback servo controller, referenced at numeral 212. If $P(z^{-1})=z^{-m}P_n(z^{-1})$, or in the frequency region where $P(z^{-1})$ is correctly modeled by $z^{-m}P_n(z^{-1})$, applying control system analysis, is the relationship between the error signal e(k) and the disturbance d(k) is given by $e(k)=-S(z^{-1})P(z^{-1})d(k)$, where the error rejection function $S(z^{-1})$ can be computed to be given by:

$$S(z^{-1})=S_{baseline}(z^{-1})(1-z^{-m}Q(z^{-1})F(z^{-1})) \quad \text{Eqn. 1}$$

Here $Q(z^{-1})$ may be a conventional band-pass filter with a center frequency $\omega_0$, such as the shown in FIG. 1. $P(z^{-1})$ and $S_{baseline}(z^{-1})=1/(1+P(z^{-1})C(z^{-1}))$ depend only on the baseline feedback design. Therefore, the new cascaded term $1-z^{-m}Q(z^{-1})F(z^{-1})$ defines the compensation performance. In conventional solutions, only the term $1-z^{-m}Q(z^{-1})$ acts to reduce the magnitude of $S(z^{-1})$. Due to the delay term $z^{-m}$, perfect disturbance rejection at $\omega_0$ is not possible for a conventional band-pass Q filter.

According to one embodiment, for optimal disturbance cancellation at $\omega_0$ (the center frequency of the Q filter $Q(z^{-1})$), the following novel minimization problem is constructed:

$$\min: |1-e^{-jm\omega_0}Q(e^{-j\omega_0})F(e^{-j\omega_0})| \quad \text{Eqn. 2}$$

As a digital filter, $F(z^{-1})$ 222 can be a finite impulse response (FIR) or an infinite impulse response (IIR) filter. In one embodiment, given a Q filter structure, when $F(z^{-1})$ depends on two design parameters, the above optimization problem has closed form solutions for the coefficients for $F(z^{-1})$, and can be readily implemented in the firmware of a HDD system. To solve the minimization, one assigns $1-e^{-jm\omega_0}Q(e^{-j\omega_0})F(e^{-j\omega_0})=0$, and obtains the coefficients of $F(z^{-1})$. More specifically, both the Real part and the Complex parts of $1-e^{-jm\omega_0}Q(e^{-j\omega_0})F(e^{-j\omega_0})$ are set to zero, and the system of two equations with two unknowns is solved.

According to one embodiment, the Q filter 220 may be chosen as a band-pass filter. The Q filter 220 may be selected as a second order band-pass filter. More particularly still, the Q filter 220 may be selected as a lattice-based second-order band pass filter modeled as $$Q(z^{-1}) = \frac{1-k_2}{2} \frac{(1+z^{-1})(1-z^{-1})}{1+k_1(1+k_2)z^{-1}+k_2 z^{-2}} \quad \text{Eqn. 3}$$

and the perfect phase cancelation filter (PPCF) 222 $F(z^{-1})$ may be modeled by:

$$F(z^{-1})=b_0+b_1 z^{-1} \quad \text{Eqn. 4}$$

The filter coefficients $b_0$ and $b_1$ may be obtained through solving the minimization problem of Eqn. 2. The solution is $$b_0 = \frac{\sin((m+1)\omega_0)}{\sin(\omega_0)} \quad \text{Eqns. 5, 6}$$

$$b_1 = \frac{-\sin(m\omega_0)}{\sin(\omega_0)}$$

Using the above results, it may be verified that exact disturbance rejection at $\omega_0$ is achieved, such that $$1-e^{-jm\omega_0}Q(e^{-j\omega_0})F(e^{-j\omega_0})=0 \quad \text{Eqn. 7}$$

The above PPCF 222 perfectly cancels the phase mismatch between d(k) and $d_{est}(k-m)$ in FIG. 2B. The design of F(Z) 222 is flexible, in that some embodiments can dispose additional pre-defined structures in $F(z^{-1})$ 222, to introduce more advanced properties therein. For example, besides the perfect phase compensation property, one embodiment can further constrain the magnitude of $F(z^{-1})$ 222 in the high-frequency region. This is useful in applications where the delay m is large and PPCF 222 carries heavy burdens to correct the phase mismatch. For example, using the same Q filter 220 as in the previous embodiment, the $F(z^{-1})$ filter 222 may be configured as:

$$F(z^{-1})=(1+z^{-1})(b_0+b_1 z^{-1}) \quad \text{Eqn. 8}$$

In the above configuration, the pre-assigned term $(1+z^{-1})$ has the properties of a low-pass filter, since it places a zero at the Nyquist frequency. This helps to attenuate the high-frequency response of the filter 222 $F(z^{-1})$.

In this case, the solution of the minimization problem may be computed as:

$$b_0 = \frac{\sin((m+1)\omega_0)+\sin((m+2)\omega_0)}{2\sin(\omega_0)+\sin(2\omega_0)} \quad \text{Eqns. 9, 10}$$

$$b_1 = \frac{-\sin(m\omega_0)-\sin((m+1)\omega_0)}{2\sin(\omega_0)+\sin(2\omega_0)}$$

The above result may be extended to the more general case where $$F(z^{-1})=H(z^{-1})(b_0+b_1 z^{-1})$$ Eqn. 11

Here, $H(z^{-1})$ can be any arbitrary user-defined transfer function. From a practical standpoint, configuring $H(z^{-1})$ as a low-pass filter is particularly useful.

At specific frequencies, one embodiment achieves perfect disturbance rejection and perfect alignment of attenuation frequencies. The Q filter 220 may be readily adjusted to selectively decrease the disturbance rejection and maintain the perfect alignment of attenuation frequencies. Specifically, after the minimization problem is solved, $F(z^{-1})$ 222 may be scaled by a scaling factor g to $gF(z^{-1})$, to achieve a desired level of disturbance attenuation. For example, g may be selected to be 0.7, such that 70% of the disturbances are attenuated at Q filter's center frequency, while maintaining perfect alignment of attenuation frequencies (i.e., no phase lag or lead at the center frequency $\omega_0$ of the Q filter 220.

Figure 3:
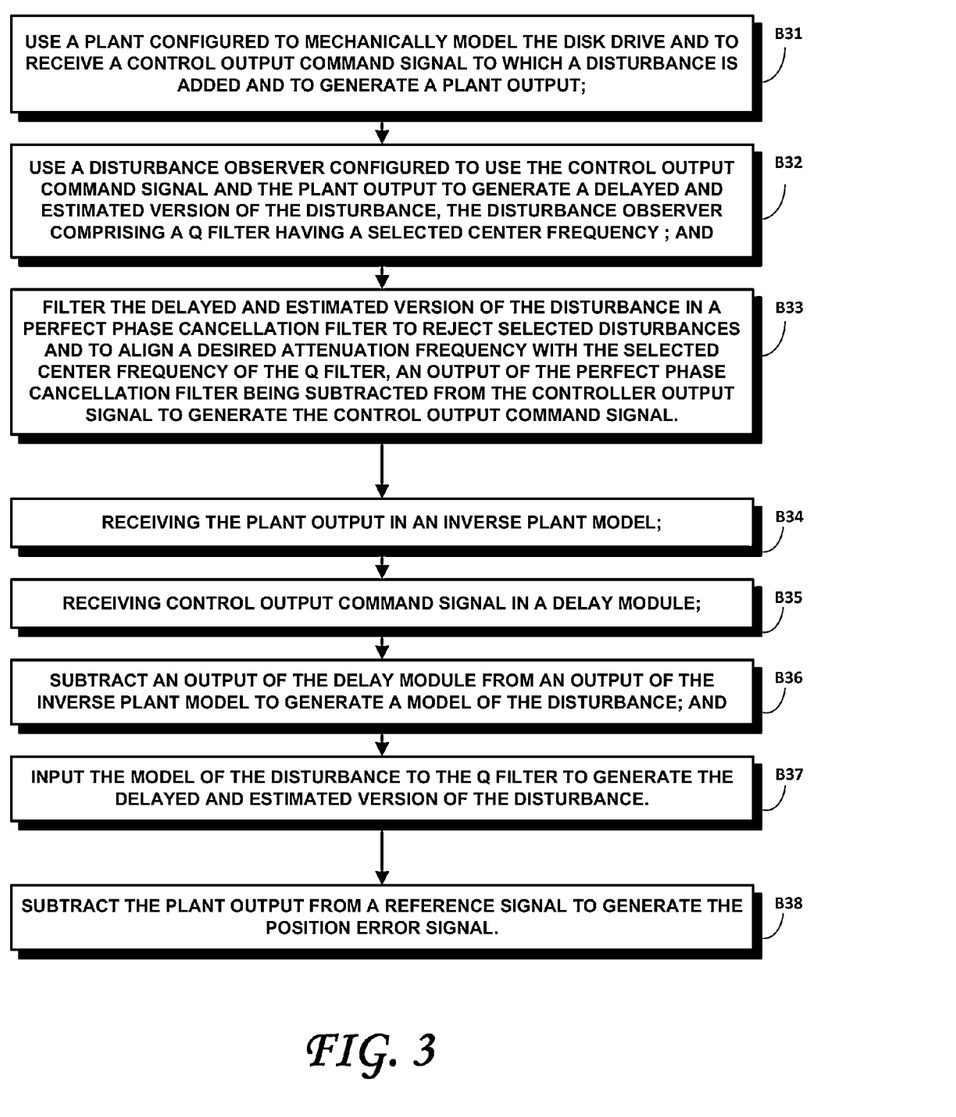
FIG. 3 is a flowchart of methods for cancelling high-frequency disturbances in a closed-loop servo control system of a hard disk drive, according to some embodiments.

FIG. 3 is a flowchart of methods for cancelling high-frequency disturbances in a closed-loop servo control system of a hard disk drive, according some embodiments. The disk drive may comprise a disk, an actuator arm comprising a head configured to read and write data to the disk, and a servo controller configured to control the actuator arm, the servo controller using a position error signal to generate a controller output signal. According to one embodiment and as shown in FIG. 3 beginning at block B31, a plant (such as Plant 210 in FIG. 2B) may be configured to mechanically model the disk drive and to receive a control command (u(k) in FIG. 2B) to which an unknown disturbance (d(k) in FIG. 2B) is added and to generate a plant output (y(k) in FIG. 2B). As shown at Block 32, a disturbance observer (such as 214 in FIG. 2B) may be is used, and may be configured to use the control command u(k) and the plant output y(k) to generate a delayed and estimated version of the disturbance ($d_{est}$(k−m) in FIG. 2B). As also shown in FIG. 2B, the disturbance observer 214 may comprise a Q filter 220 having a selected center frequency $\omega_0$. As shown at block B33, the delayed and estimated version of the disturbance $d_{est}$(k−m) may be filtered in a perfect phase cancellation filter (as shown at 222 in FIG. 2B) to reject selected disturbances and to align a desired attenuation frequency with the selected center frequency of the Q filter 220. An output of the perfect phase cancellation filter may be subtracted (at 204 in FIG. 2B) from the controller output signal (i.e., the output of $C(z^{-1})$ 212) to generate the control command u(k).

According to one embodiment shown beginning at block B34 of FIG. 3, the plant output y(k) may be received in an inverse plant model (($P_n(z^{-1}))^{-1}$ at 216 in FIG. 2B) and the control command u(k) may be received in a delay module ($z^{-m}$ at 218 in FIG. 2B), as shown at block B35. As shown at B36, an output of the delay module 218 may be subtracted from an output of the inverse plant model 216 to generate a model of the disturbance ($d_n$(k−m) in FIG. 2B) and the model of the disturbance may then be input to the Q filter 220 to generate the delayed and estimated version of the disturbance $d_{est}$(k−m), as called for at block B37.

According to one embodiment shown at B38, the plant output y(k) may then be subtracted from a reference signal (r(k) in FIG. 2B) to generate the position error signal (e(k) in FIG. 2B) that may then be input to the controller 212, to close the loop.

Figure 4:
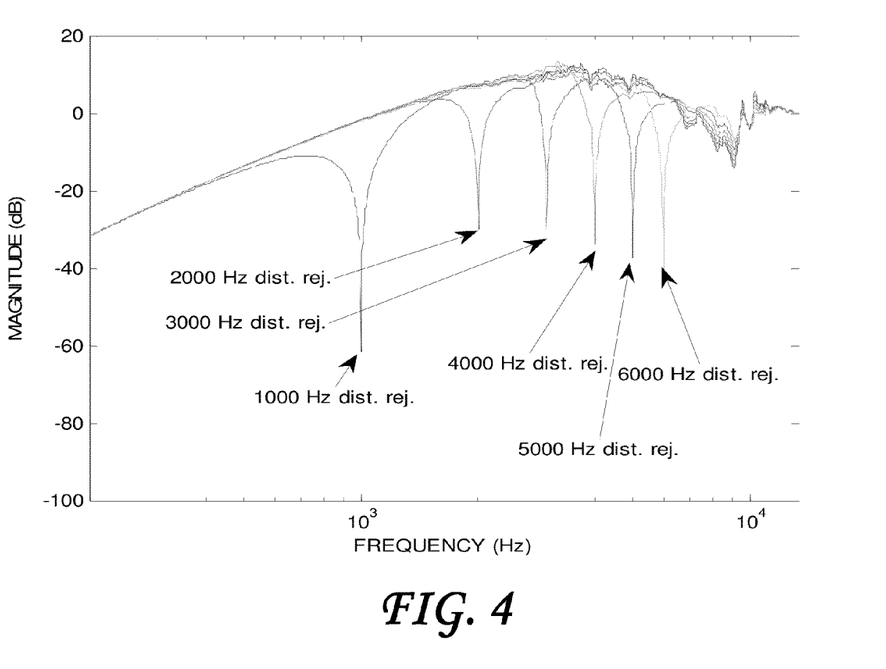
FIG. 4 shows a graph of error rejection curves, exhibiting significant rejections from 1000 Hz to 6000 Hz, according to one embodiment.

One embodiment exhibits greatly increased attenuation capacity. Indeed, FIG. 4 shows six error rejection curves that show rejection of disturbances from 1000 Hz to 6000 Hz, obtained from the deployment of a PPCF according to one embodiment. Accordingly, HDDs may be deployed in fields or in applications from which they were previously excluded or pass performance tests that were commonly failed before. For example, in an intelligent TV, disturbances may occur from 1000 Hz to 6000 Hz. In a conventional DOB-based system where m=2 (m being the number of delays in the Plant $P(z^{-1})$ 210) and where the sampling time $T_s=3.75\times10^{-5}$ sec, if the upper limit is for the allowable phase mismatch in the DOB is 60 degrees, then the maximum attenuation frequency is only $60/360/m/T_s=2220$ Hz, which is well below the desired attenuation frequencies. In contrast, according to one embodiment, the attenuation frequency can be as high as 6000 Hz, which is the upper limit of the frequency region where an accurate system model can be obtained. This translates to an expansion of attenuation capacity of about 170.27%. In another embodiment where m=3 and $T_s=2.17\times10^{-5}$ sec, using the same upper limit for the allowable phase mismatch, the maximum attenuation frequency in DOB is only 2560 Hz. The improvement in the attenuation capacity, in this case, is 134.38%. Based on simulation results using ten actual disturbance profiles, the expected track mis-registration (TMR) improvement is larger than 10%.

Figure 5:
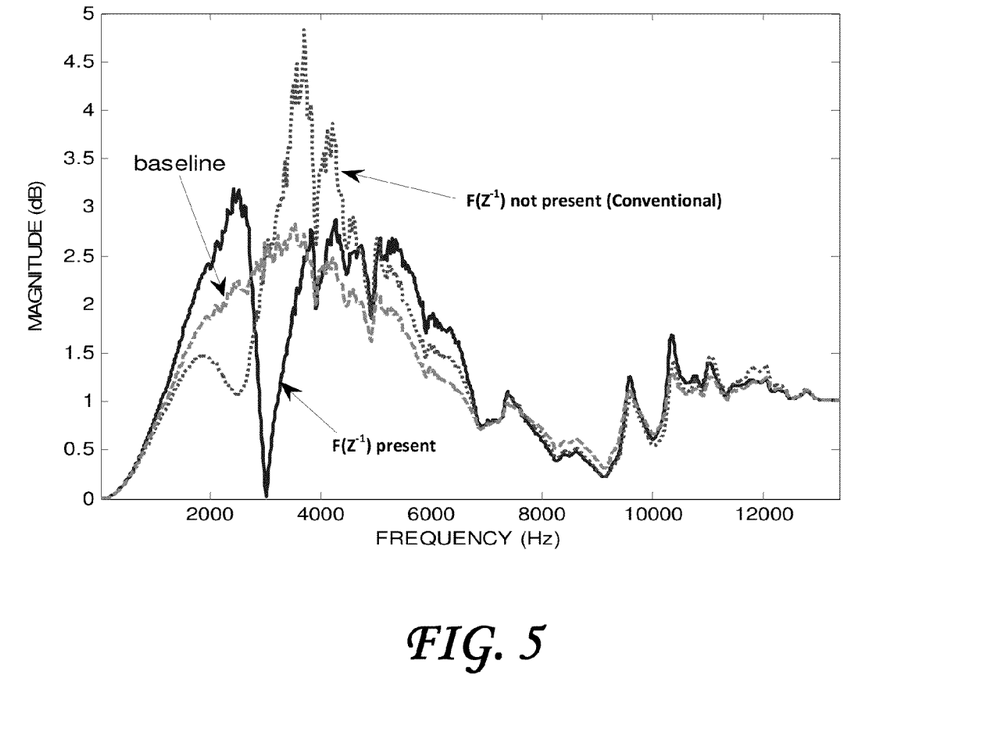
FIG. 5 is a graph showing error rejection curves in a disk drive with boosted rejection at about 3000 Hz, incorporating one embodiment, as compared to conventional attenuation methods.

Another advantage of one embodiment is the greatly improved stability robustness. FIG. 5 shows the ERCs in an actual disk drive, with the disturbance rejection tuned to 3000 Hz. Without the present PPCF digital filter $F(z^{-1})$ configured as shown and described herein, the ERC not only incorrectly provides small gains at about 2500 Hz, but also greatly amplifies the disturbance between about 3000 Hz and about 4200 Hz, as shown. Therefore, conventional systems literally end up amplifying what should be attenuated. Such amplification causes serious robustness issues for actual real-world implementations. When the PPCF $F(z^{-1})$ 222 is present and configured described herein, the frequency notch is perfectly aligned at 3000 Hz and provides perfect disturbance rejection at 3000 Hz, the center frequency $\omega_0$ of the Q filter 220.

An additional advantage of one embodiment concerns cost reduction. When an embodiment is incorporated in a HDD, no hardware sensors (e.g., vibration sensors) are required, thereby reducing the need for the procurement and installation of hardware sensors in some drive families, thus saving a non-trivial amount on each drive.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various is omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that both the form and function of both the Q filter 220 and the PPCF 222 may be adapted to the needs at hand and may, therefore, differ from those described herein. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A disk drive, comprising:
   a disk;
   an actuator arm comprising a head configured to read and write data to the disk;
   a servo controller configured to control the actuator arm, the servo controller using a position error signal to generate a controller output signal;
   a plant configured to mechanically model the disk drive and to receive a control command to which a disturbance is added and to generate a plant output;
   a disturbance observer, the disturbance observer using the control command and the plant output to generate a delayed and estimated version of the disturbance, the disturbance observer comprising a Q filter having a selected center frequency $\omega_0$, and
   a perfect phase cancellation filter, the perfect phase cancellation filter being configured to receive the delayed and estimated version of the disturbance and to reject selected disturbances and align a desired attenuation frequency with the selected center frequency of the Q filter, an output of the perfect phase cancellation filter being subtracted from the controller output signal to generate the control command.

2. The disk drive of claim 1, wherein the disturbance observer further comprises an inverse plant model configured to receive the plant output and a delay module configured to receive the control command, an output of the delay module being subtracted from an output of the inverse plant model to generate a model of the disturbance that is input to the Q filter to generate the delayed and estimated version of the disturbance.

3. The disk drive of claim 1, wherein the plant output is subtracted from a reference signal to generate the position error signal.

4. The disk drive of claim 1, wherein the perfect phase cancellation filter is a finite impulse response (FIR) filter.

5. The disk drive of claim 1, wherein the perfect phase cancellation filter is an infinite impulse response (IIR) filter.

6. The disk drive of claim 1, wherein the Q filter is a band-pass filter.

7. The disk drive of claim 1, wherein the Q filter is a second-order band-pass filter modeled by $$Q(z^{-1}) = \frac{A_Q(z^{-1})}{B_Q(z^{-1})}.$$

8. The disk drive of claim 7, wherein, for optimal disturbance cancellation at the center frequency $\omega_0$ of the Q filter, coefficients of the perfect phase cancellation filter $F(z^{-1})$ are computed such that $1-e^{-jm\omega_0}Q(e^{-j\omega_0})F(e^{-j\omega_0})=0$ in which m corresponds a number of delay samples of a delay module of the disturbance observer.

9. The disk drive of claim 1, wherein the Q filter is modeled by $$Q(z^{-1}) = \frac{1-k_2}{2} \frac{(1+z^{-1})(1-z^{-1})}{1+k_1(1+k_2)z^{-1}+k_2z^{-2}}.$$

10. The disk drive of claim 9, wherein, for optimal disturbance cancellation at the center frequency $\omega_0$ of the Q filter, coefficients of the perfect phase cancellation filter $F(z^{-1})$ are computed such that $1-e^{-jm\omega_0}Q(e^{-j\omega_0})F(e^{-j\omega_0})=0$ in which m corresponds a number of delay samples of the delay module.

11. The disk drive of claim 10, wherein the perfect phase cancellation filter is modeled as $F(z^{-1})=b_0+b_1z^{-1}$, in which coefficients $b_0$ and $b_1$ are configured to reject the selected disturbances and align the desired attenuation frequency with the selected center frequency $\omega_0$ of the Q filter.

12. The disk drive of claim 10, wherein and $$b_0 = \frac{\sin((m+1)\omega_0)}{\sin(\omega_0)}$$

and $$b_1 = \frac{-\sin(m\omega_0)}{\sin(\omega_0)}$$

and wherein m corresponds a number of delay samples of the delay module.

13. The disk drive of claim 10, wherein the perfect phase cancellation filter is modeled as $F(z^{-1})=H(z^{-1})(b_0+b_1z^{-1})$, in which coefficients $b_0$ and $b_1$ are configured to reject the selected disturbances and to align the desired attenuation frequency with the selected center frequency $\omega_0$ of the Q filter and in which $H(z^{-1})$ is a predetermined transfer function.

14. The disk drive of claim 13, wherein the predetermined transfer function is a transfer function of a low-pass filter.

15. The disk drive of claim 13, wherein $H(z^{-1})=(1+z^{-1})$.

16. The disk drive of claim 15, wherein $b_0$ and $b_1$ are defined as $$b_0 = \frac{\sin((m+1)\omega_0) + \sin((m+2)\omega_0)}{2\sin(\omega_0) + \sin(2\omega_0)}$$

$$b_1 = \frac{-\sin(m\omega_0) - \sin((m+1)\omega_0)}{2\sin(\omega_0) + \sin(2\omega_0)}$$

and wherein m corresponds to a number of delay samples of the delay module.

17. A method for cancelling high frequency disturbances in a closed-loop servo control system of a hard disk drive, the hard disk drive comprising a disk, an actuator arm comprising a head configured to read and write data to the disk, and a servo controller configured to control the actuator arm, the servo controller using a position error signal to generate a controller output signal, the method comprising:
   using a plant configured to mechanically model the disk drive and to receive a control command to which a disturbance is added and to generate a plant output;
   using a disturbance observer configured to use the control command and the plant output to generate a delayed and estimated version of the disturbance, the disturbance observer comprising a Q filter having a selected center frequency $\omega_0$; and
   filtering the delayed and estimated version of the disturbance in a perfect phase cancellation filter to reject selected disturbances and to align a desired attenuation frequency with the selected center frequency of the Q filter, an output of the perfect phase cancellation filter being subtracted from the controller output signal to generate the control command.

18. The method of claim 17, further comprising:
   receiving the plant output in an inverse plant model;

receiving control command in a delay module;
subtracting an output of the delay module from an output of the inverse plant model to generate a model of the disturbance; and
inputting the model of the disturbance to the Q filter to generate the delayed and estimated version of the disturbance.

19. The method of claim 17, further comprising subtracting the plant output from a reference signal to generate the position error signal.

20. The method of claim 17, wherein the perfect phase cancellation filter is a finite impulse response (FIR) filter.

21. The method of claim 17, wherein the perfect phase cancellation filter is an infinite impulse response (IIR) filter.

22. The method of claim 17, wherein the Q filter is a band-pass filter.

23. The method of claim 17, wherein the Q filter is a second order band-pass filter modeled by $$Q(z^{-1}) = \frac{A_Q(z^{-1})}{B_Q(z^{-1})}.$$

24. The method of claim 23 wherein, for optimal disturbance cancellation at the center frequency $\omega_0$ of the Q filter, the method further comprises computing coefficients of the perfect phase cancellation filter $F(z^{-1})$ such that $1-e^{-jm\omega_0}Q(e^{-j\omega_0})F(e^{-j\omega_0})=0$ in which m corresponds a number of delay samples of a delay module.

25. The method of claim 17, wherein the Q filter is modeled by $$Q(z^{-1}) = \frac{1-k_2}{2} \frac{(1+z^{-1})(1-z^{-1})}{1+k_1(1+k_2)z^{-1}+k_2 z^{-2}}.$$

26. The method of claim 25, wherein, for optimal disturbance cancellation at the center frequency $\omega_0$ of the Q filter, the method further comprises computing coefficients of the perfect phase cancellation filter $F(z^{-1})$ such that $1-e^{-jm\omega_0}Q(e^{-j\omega_0})F(e^{-j\omega_0})=0$ in which m corresponds a number of delay samples of the delay module.

27. The method of claim 26, further comprising modeling the perfect phase cancellation filter being as $F(z^{-1})=b_0+b_1 z^{-1}$, in which coefficients $b_0$ and $b_1$ are configured to reject the selected disturbances and to align the desired attenuation frequency with the selected center frequency $\omega_0$ of the Q filter.

28. The method of claim 26, wherein $$b_0 = \frac{\sin((m+1)\omega_0)}{\sin(\omega_0)}$$

and $$b_1 = \frac{-\sin(m\omega_0)}{\sin(\omega_0)}$$

wherein m corresponds to a number of delay samples of the delay module.

29. The method of claim 26, further comprising modeling the perfect phase cancellation filter as $F(z^{-1})=H(z^{-1})(b_0+b_1 z^{-1})$, in which coefficients $b_0$ and $b_1$ are configured to reject the selected disturbances and align the desired attenuation frequency with the selected center frequency $\omega_0$ of the Q filter and in which $H(z^{-1})$ is a predetermined transfer function.

30. The method of claim 29, wherein the predetermined transfer function is a transfer function of a low-pass filter.

31. The method of claim 29, wherein $H(z^{-1})=(1+z^{-1})$.

32. The method of claim 31, wherein $b_0$ and $b_1$ are defined as $$b_0 = \frac{\sin((m+1)\omega_0)+\sin((m+2)\omega_0)}{2\sin(\omega_0)+\sin(2\omega_0)}$$

$$b_1 = \frac{-\sin(m\omega_0)-\sin((m+1)\omega_0)}{2\sin(\omega_0)+\sin(2\omega_0)}$$

and wherein m corresponds to a number of delay samples of the delay module.

* * * * *